US006293983B1

(12) United States Patent
More

(10) Patent No.: US 6,293,983 B1
(45) Date of Patent: Sep. 25, 2001

(54) FILTER ASSEMBLY HAVING A DISPOSABLE PRE-FILTER

(76) Inventor: Ronald More, 507A Childers Road, Gisborne 3801 (NZ)

( * ) Notice: Subject to any disclaimer, the term of this patent is extended or adjusted under 35 U.S.C. 154(b) by 0 days.

(21) Appl. No.: 09/402,345

(22) PCT Filed: Apr. 3, 1998

(86) PCT No.: PCT/NZ98/00046

§ 371 Date: Oct. 4, 1999

§ 102(e) Date: Oct. 4, 1999

(87) PCT Pub. No.: WO98/45021

PCT Pub. Date: Oct. 15, 1998

(30) Foreign Application Priority Data

Apr. 4, 1997 (NZ) ........................................................ 314526
Oct. 13, 1997 (NZ) ........................................................ 328953

(51) Int. Cl.[7] .............................. B01D 29/56; B01D 39/16
(52) U.S. Cl. ........................ 55/486; 55/491; 55/501; 55/528; 55/DIG. 36; 55/DIG. 45; 96/226
(58) Field of Search .......................... 55/486, 487, 491, 55/501, 481, 506, 525, 526, 528, DIG. 36, DIG. 45; 96/226

(56) References Cited

U.S. PATENT DOCUMENTS 3,660,969 * 5/1972 Fox ...................................... 55/385.1
4,336,038 * 6/1982 Schultheiss et al. ............ 55/DIG. 36
4,340,402 * 7/1982 Catron ..................................... 55/487
4,689,058 * 8/1987 Vogt et al. ............................. 55/486
4,921,512 * 5/1990 Maryyanek et al. ................... 55/486
5,154,161 * 10/1992 Rogers et al. ................... 55/DIG. 36
5,318,607 * 6/1994 Malloy et al. ......................... 55/486
5,419,953 * 5/1995 Chapman .............................. 55/486
5,529,838 * 6/1996 Lee ....................................... 55/522
5,874,052 * 2/1999 Holland ............................... 422/171
5,935,303 * 8/1999 Kimura ................................... 96/69

FOREIGN PATENT DOCUMENTS

1200888 * 8/1970 (GB) ............................. 55/DIG. 36
2 069 368 8/1981 (GB).
2 287 664 9/1995 (GB).
61-71814 * 4/1986 (JP) ......................................... 96/99
8173843 7/1996 (JP).
WO 95/05234 2/1995 (WO).

* cited by examiner

Primary Examiner—David A. Simmons
Assistant Examiner—Robert A. Hopkins
(74) Attorney, Agent, or Firm—Young & Thompson

(57) ABSTRACT

A filter assembly for use in an air filtration unit, particularly for filtering cooking vapors. The assembly includes a filter disposed across an air flow and a grease pre-filter located upstream of the filter. The grease pre-filter is formed principally from wool fiber having an approximate density of 150–200 g/m² and a loft of substantially 15–20 mm. The use of such a pre-filter substantially prolongs the service life of the filter before cleaning is required.

21 Claims, 4 Drawing Sheets

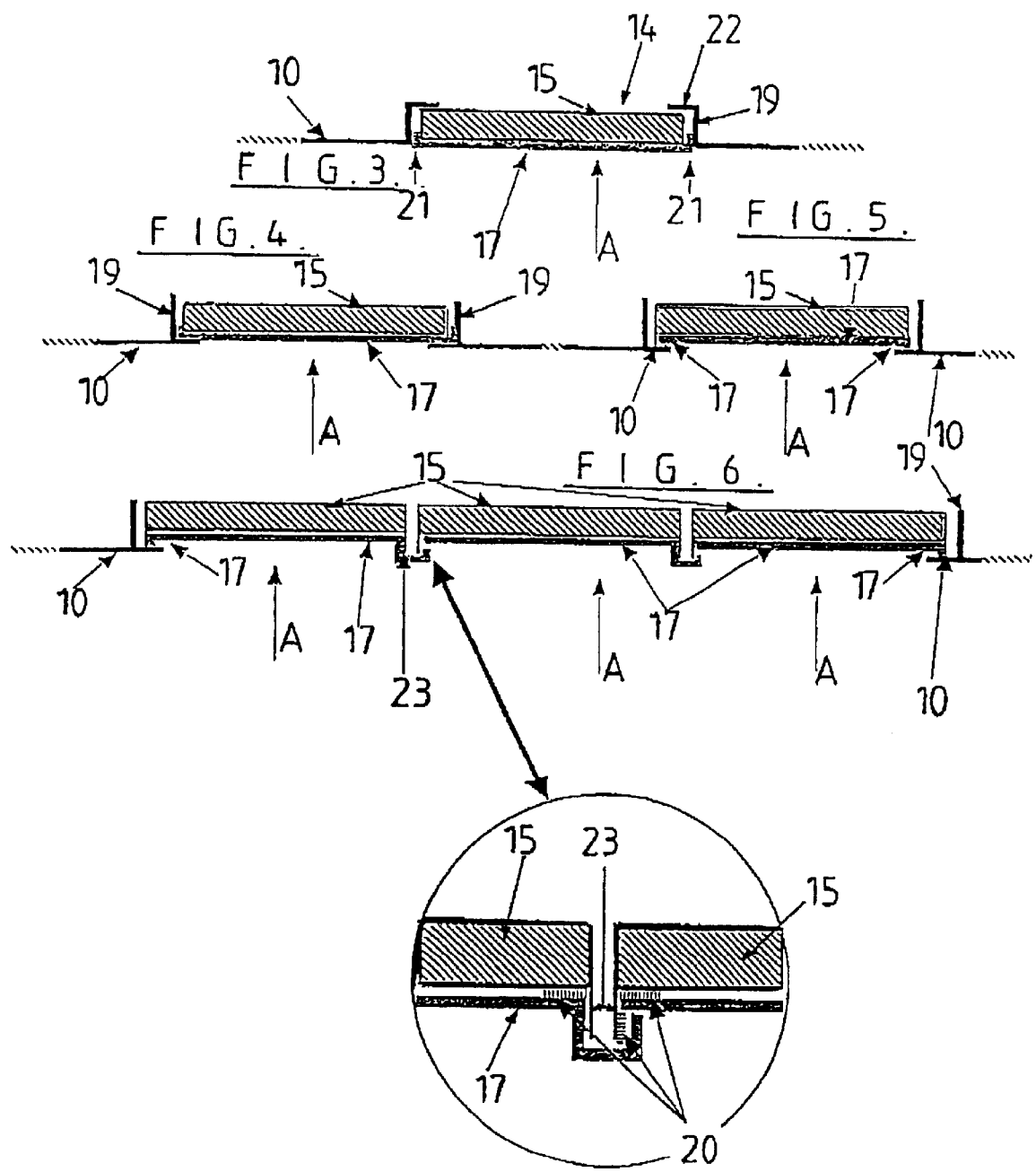

FILTER ASSEMBLY HAVING A DISPOSABLE PRE-FILTER

BACKGROUND OF THE INVENTION

1. Technical Field

The present invention is directed to filters for use in air filtration units.

2. Background Art

The present invention finds predominant use in the field of air filtration units. The term, air filtration unit, includes devices such as air extractor hoods typically found in commercial food premises, various air extraction devices and such like, and may extend to air conditioning units. The primary consideration is where there is an airflow to be filtered.

The air filtration elements which are traditionally used are generally constructed of a reusable material able to be cleaned or reconditioned. Traditional exhaust filter elements generally comprise metal mesh or honeycomb material supported by a frame. More recently, flame baffle filters have gained acceptance.

When filtering air in a food preparation environment, air laden with greasy cooking vapour, is drawn through the filters by fan assistance. The greasy droplets are trapped by the filters and the "purified" air passes through ducting to be released into the environment outside the building. In the process, the interior of the hood, fan and ducting become progressively and often quickly contaminated and greasy.

The build up of contaminants in the ducting constitutes a significant fire hazard.

The filter elements often become quickly soiled depending upon conditions of use and require regular cleaning to maintain an efficient filtering action to provide, e.g. clean air in the workplace. If left for a prolonged period, severe clogging of the filter element may occur, reducing airflow, filtering performance and creating unpleasant working conditions.

Badly soiled filters can also release trapped contaminants onto food and food processing surfaces beneath the air filter.

Cleaning filter elements is messy, often inconvenient and deposits may be difficult to remove, requiring quite harsh chemicals. Cleaning the hood interior, fan and ducting is even more difficult because of restricted access.

In larger population centres, specialist service companies are often employed to remove soiled elements by roster and to then fit clean replacements, (sometimes unnecessarily), otherwise staff or proprietors must attempt the work themselves.

The continuing rapid growth of the fast food industry in which deep fat frying methods are often employed, ensures that the extent of the problems associated with exhaust hoods, metal filters and contaminated flues are similarly multiplying.

There are therefore, difficulties involved with the use of filter elements commonly in use, arising from the neglect of their cleaning. This neglect is usually an indirect consequence of the difficulties associated with cleaning or can simply arise from a desire to keep costs down.

SUMMARY OF THE INVENTION

It is an object of the present invention to address the foregoing problems or at least to provide the public with a useful choice.

Further aspects and advantages of the present invention will become apparent from the ensuing description which is given by way of example only.

According to one broad aspect of the invention there is provided a filter assembly for use in an air filtration unit comprising a filter disposed across an airflow aperture and a pre-filter disposed such that airflow passes therethrough prior to passing through said filter.

Preferably the pre-filter is of a disposable type.

According to a preferred form the pre-filter is made from natural or synthetic fibres. The pre-filter can be of woven, non-woven or needle punched construction. In a preferred embodiment the pre-filter is constructed solely or primarily of wool. The pre-filter can include reinforcement means.

In one form of the invention the pre-filter is removably fastened to the filter. In another form the pre-filter is located in position by the filter fitting across said airflow aperture.

A second broad aspect of the invention provides a filter element characterised in that the filter element is formed principally from wool. The wool can be in woven, non-woven or needle punched form and optionally can include reinforcement means.

According to a third broad aspect of the invention there is provided a method of modifying an air filtration unit having a filter element disposed in an airflow passage or across an aperture into an airflow passage, the method being characterised by the mounting of a pre-filter disposed adjacent or prior to the filter element.

In a preferred form the pre-filter is formed principally of natural or synthetic fibres which can be in woven, non-woven form or needle punched. The pre-filter can be formed from wool. The pre-filter can be of a disposable type.

According to one form of the method the pre-filter is mounted with the filter element.

BRIEF DESCRIPTION OF THE DRAWINGS

FIGS. 3, 4, 5 and 6 are cross-sectional illustrations of different forms of the filter assembly.

DISCLOSURE OF PREFERRED EMBODIMENTS OF THE INVENTION

Figure 1:
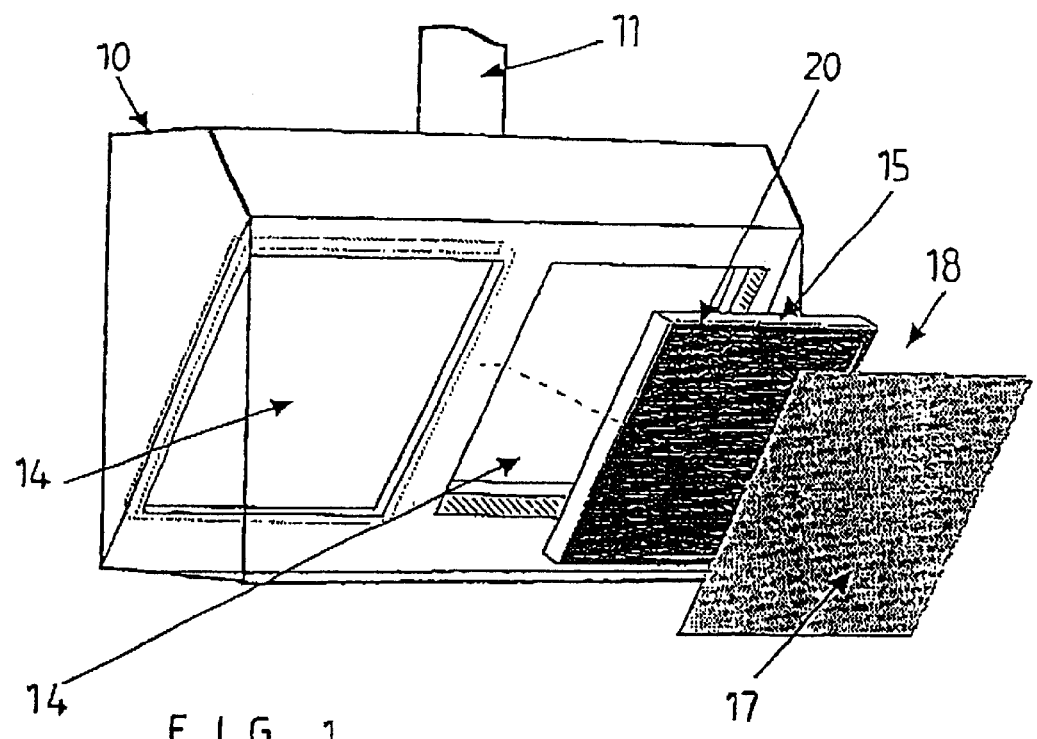
FIG. 1 is a perspective exploded view of an exhaust hood and flue with a filter assembly having a pre-filter according to the present invention.
Figure 2:
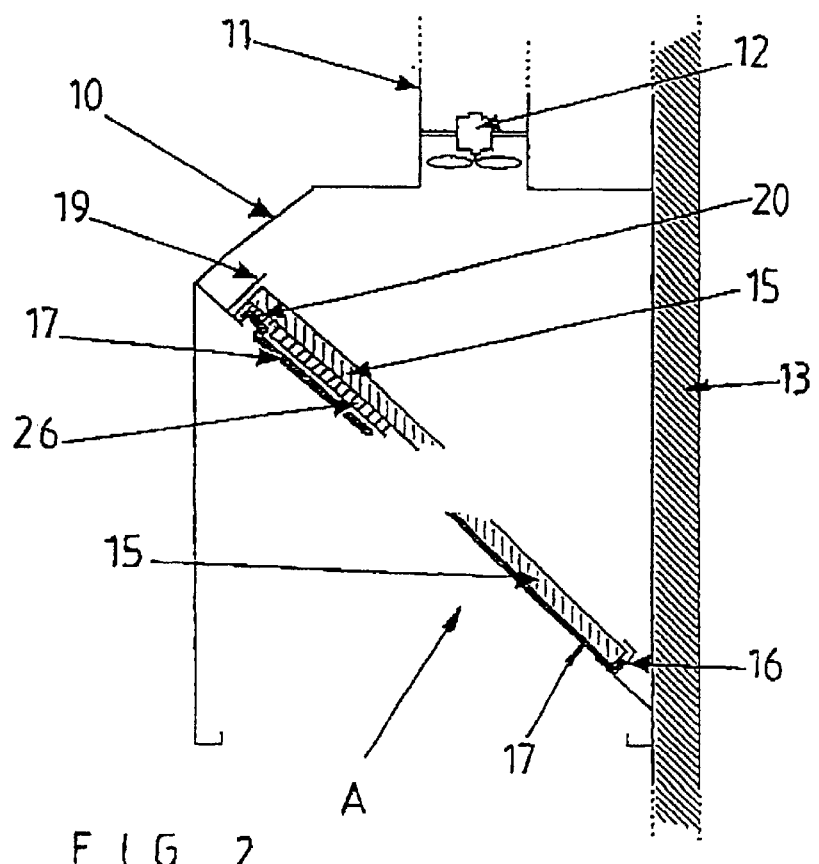
FIG. 2 is a cross-sectional view of the filter assembly in the exhaust hood.

In FIGS. 1 and 2 there is shown a conventional exhaust hood 10 with flue 11 extending from an upper part of the exhaust hood. A fan 12 is mounted in accordance with conventional practice in the flue 11 adjacent its coupling into the exhaust hood 10. As shown in FIG. 2, the exhaust hood 10 is typically mounted to a wall or other fixed structure 13.

It will be observed that in FIG. 1 the left-hand aperture 14 is smaller than the metal filter indicated in dotted outline. In this arrangement the metal filter is mounted into the hood from within the aperture. By contrast the right-hand aperture 14 is larger than the metal filter 15 which is mounted from without the hood.

The exhaust hood 10 includes one or more apertures 14 which are formed to receive a metal filter 15. Air flow into the filter 15 is generally in the direction of arrow A.

Different methods of mounting the metal filter 15 with the hood 10 to thereby extend over the opening 14 are known. One typical arrangement is indicated in FIG. 2 where the peripheral dimensions of the metal filter 15 are greater than that of the opening 14. However, by manipulating the filter 15 it can be inserted through opening 14 to locate within the hood 10 and locate with the surrounding material of the hood which defines opening 14. To maintain the filter in position a guide channel 16 extends along the inside of the hood 10 adjacent the lowermost edge of the opening 14 and the lowermost edge of the filter 15 rests in the guide channel 16.

According to the present invention a second or what can more correctly be called a pre-filter 17 is combined with the metal filter 15 to form a filter assembly 18. As shown in FIGS. 1 and 2 the pre-filter 17 engages substantially in a face to face arrangement with the metal filter 15 when the filter assembly 18 is installed in the hood 10.

According to one form of the invention, the pre-filter 17 can be temporarily held by a hook tape 20 mounted on the face of the metal filter at the periphery thereof. The edge of the pre-filter 17 is then simply wrapped about the edges of the metal filter 15 as shown in FIG. 4. The pre-filter is thus held in place by being sandwiched between the metal filter 15 and that part of the exhaust hood 10 which extends about the aperture 14 as well as the mounting channel 16 and any other upstands or parts of the hood 19 which are located adjacent the metal filter 15 when in position in the hood 10. As shown in FIG. 4, the incoming airflow A passes through the pre-filter 17 before passing through the metal filter 15.

An alternative arrangement is where a hook tape 20 is mounted on the face of the metal filter 15 at the periphery thereof. The pre-filter 17 is engaged with this hook tape 20 to hold the pre-filter 17 on the metal filter 15. This is shown in the upper part of the filter 15 in FIG. 2.

According to the preferred form of the invention the pre-filter is formed of a material which engages and is held by the hook tape 20.

According to the preferred form of the invention, the pre-filter 17 can be constructed of what can be described as blanket material. This material should ideally be relatively low in cost to be economical but also exhibit satisfactory filtering properties. Further the filter element should preferably be made of a fire retardant material or the material of the filter element may be treated to ensure that it is suitably fire resistant to comply with fire safety standards.

Preferred embodiments rely on a non-woven blanket or needle punched material where the weave or coarseness is commensurate for the application to which it is applied. In some instances several layers of blanket material may be relied upon. Each layer may be identical (with the material being layered to increase the overall filter thickness).

However, it is also possible to construct layers of different materials. This may allow for progressive entrapment of finer particles so that the finer filtering material does not become quickly clogged with large particles, which would otherwise rapidly block the air flow through the air filtration unit.

The use of a filter blanket which has different coarseness or weaves on either face is also possible. For instance a filter element, or blanket may be used which has a coarse or honeycomb weave or structure on one side, and a substantially finer weave or honeycomb on the other side.

The blanket may be made of absorbent material or having an augmented or enhanced surface area to reduce premature blocking of the filter including natural fibres such as wool (which has inherent fire retardant properties and an affinity for oil or grease) or be a synthetic product such as polyester and so forth treated so as to become fire retarding or with enhanced oil or grease retaining characteristics and/or having an augmented or enhanced surface area.

To increase the heat resistance of a wool filter, the material can be treated chemically. In particular with the denser needle punched variant the filter may be treated with a borax/boric acid solution or Zirpro thereby increasing heat resistance especially for use in high heat applications such as when flambé dishes are prepared.

The filter element may exhibit the ability to wick, spread or otherwise conduct grease vapour droplets along its fibres. The fibres may have serrations occurring along their length to provide a greatly increased surface area on which to store the droplets. This avoids filling up the inter-fibre spaces prematurely which would quickly block the filter blanket. These characteristics also tend to retain and prevent release of tapped contaminates from the blanket during normal use.

The ultimate formation of small droplets of contaminates on the outer fibres of the upstream filter face warn the user that the filter is approaching saturation and will shortly require replacement.

Other embodiments provide for the filter element being made from a synthetic product such as polyester and so forth treated to become fire retarding. Staple fibre augmented polypropylene can be used. The synthetic product can be a synthetic foam, batting, mesh, fibres and the like.

In other embodiments the blanket pre-filter element may incorporate a thin sheet of another form of filter material which may be used as a pre-filter across the face of the above mentioned blanket material.

Many filter elements, such as filter blankets, exhibit a degree of flexibility and/or extensibility which may not always be desirable depending upon the size of the aperture that they cover and the stresses that they are subjected to. In such instances it may be desirable to provide some form of support for the filter element.

This may be provided in a number of ways. For instances a rigid or semi-rigid support element may be used co-extensively with the filter element material. This support element should preferably be air permeable and ideally should not significantly impede air flow through the combined air filter and support arrangement. Many lattice and mesh materials are available which may be suitable for this purpose.

Another method of providing support is to provide cross members on the frame to help support the filter element at various points.

Support may also be achieved by weaving or otherwise attaching the fibres to a suitable backing that provides the required tensile strength, rigidity and air permeability.

A further alternative method of support is to bond the filter element fibres together. Such bonding may be achieved by the application of adhesive materials throughout the blanket fibres before, during or after manufacture of the blanket.

The preferred bonding technique however, is to evenly infiltrate the blanket fibre with a low melting point synthetic compatible fibre, e.g. polyester, before manufacture. The blanket once made is then baked in an oven causing the synthetic fibre to melt and adhere to the filter fibres. On cooling the melted synthetic fibres harden and substantially bond the blanket fibres together providing the filter element with stability and tensile strength.

Any of the foregoing methods may be used in conjunction with each other to impart the required tensile strength to the filter element.

In a more preferred form of the invention the pre-filter 17 is formed from natural wool which can be suitably dyed by e.g. adding a colour fast dyed fabric to produce a tint for aesthetic purposes. The filter 17 can be of woven or non-woven construction but in a more preferred form of the invention the pre-filter 17 is of non-woven or needle punched wool. More preferably, the non-woven or needle punched filter includes integral support or strengthening means.

Greasy vapours drawn through the pre-filter 17 will naturally adhere to the wool fibres upon contact due to wool's considerable affinity for grease and oil. The filter element is made to provide just the appropriate mesh size to remove virtually all the airborne contaminants, including moisture vapour, without noticeably affecting airflow. Much of the incoming contaminants collide with and adhere to the outer fibres of the filter. The wool then characteristically "wicks" the collecting material along the fibres and into the core of the filter. This natural movement is encouraged by the flow of passing air.

The contaminants adhering to the pre-filter 17 are thus stored along the wool fibres themselves, rather than within the inter-fibre spaces. This prevents premature blocking of the filter which actually favourably expands under the influence of collecting moisture. As the wool fibres near the limit of material that they can hold, their capacity to wick contaminants reduces. Once there is nowhere else to store incoming material, small droplets of contaminants begin to form on the outer fibres of the upstream (ie outer) face of the filter. The droplets are a prime visual indication that the pre-filter will soon need to be replaced making management of the system very easy.

In the preferred form of pre-filter material, the non-woven variant is made of high bulk wool (with reinforcement) and can be a loft of about 15 to 20 mm thick and of a weight of about 150 to 200 gsm.

Using the hook tape 20 method of attachment of the pre-filter 17 to the metal filter 15 the attachment can take place to form the filter assembly 18 prior to the filter assembly being installed in the hood 10, e.g. as shown in FIGS. 3 or 4.

FIG. 3 shows yet a further means of mounting the pre-filter to the metal filter where a narrow gap shown at 21 exists between the metal filter 15 and an inwardly extending surround 19 with inwardly directed shoulders 22 which define the opening 14. In such an arrangement the peripheral edge of the filter 17 is wedged between the peripheral edge of the metal filter 15 and the surround 19. As with the previously described arrangements the metal filter 15 can also include the hook tape 20 as shown in FIG. 1 to further hold the pre-filter 17 to the metal filter 15.

FIGS. 5 and 6 illustrate a method whereby retention of the pre-filter during its service life relies upon the hook tape 20. For convenience, the metal filters 15 have projecting walls 23 to enable the pre-filter to be removed and replaced without requiring the simultaneous removal and replacement of the metal filter 15.

Yet a further arrangement is shown in FIG. 6 where a plurality of metal filters 15 are located side by side in a single opening 14. Essentially the pre-filter 17 is fixed to the metal filter 15 using hook pile tape. However, as shown in the detail portion of FIG. 6 it is preferred that one pre-filter extends to span the space between adjacent walls 23 and be fastened to a surface of the wall of the filter adjacent the filter to which the pre-filter 17 is fitted by a hook tape 20.

Other means of attaching the pre-filter 17 to the metal filter 15 will be apparent to those skilled in the art, such as wedging the pre-filter between adjacent surfaces of metal filters 15.

As will be evident from the foregoing the pre-filter 17 can beneficially also seal the gap commonly found between the sides of the metal filters 15 and the periphery of the opening 14 or any adjacent metal filter. A direct benefit of the seal which is thus formed is to prevent unfiltered air from entering and contaminating the exhaust hood.

Figure 7:
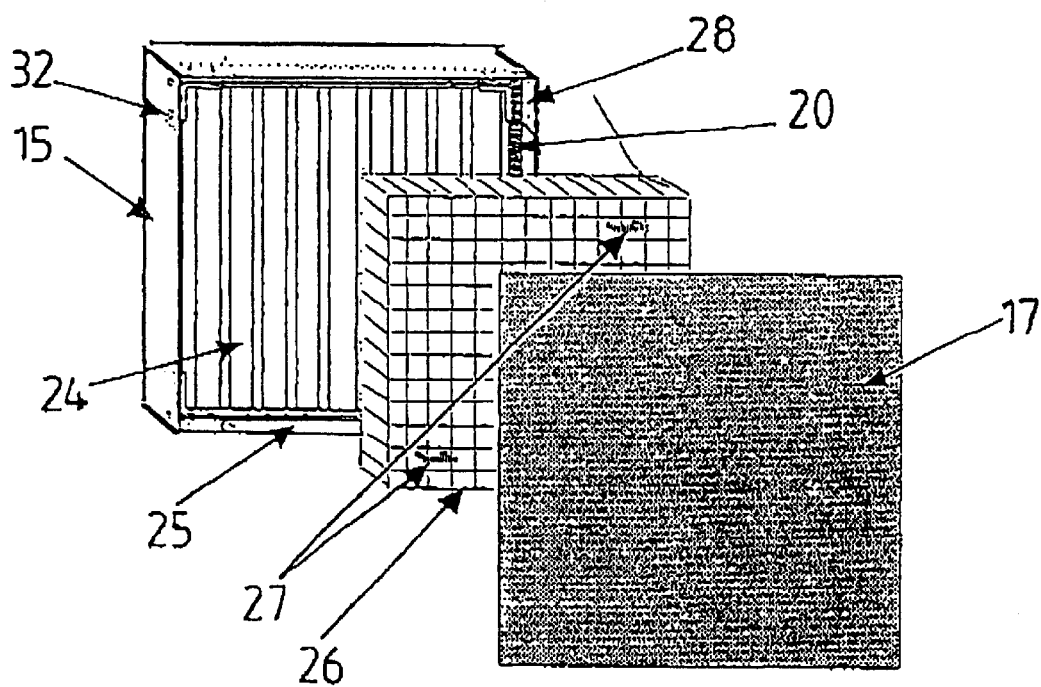
FIG. 7 is a perspective exploded view of a further form of filter assembly.
Figure 8:
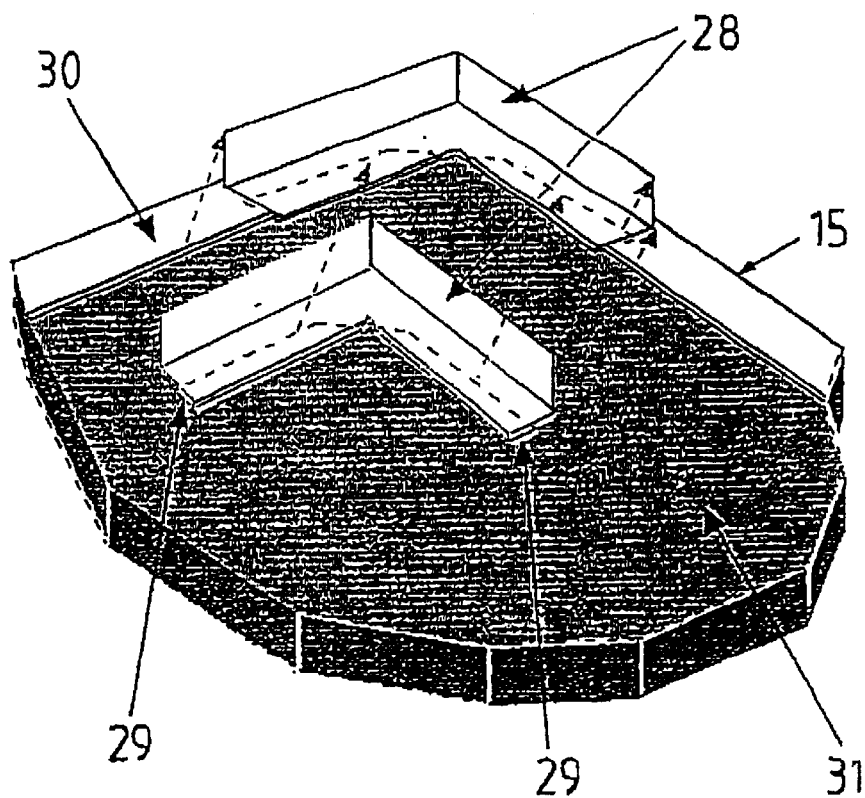
FIG. 8 is a detail perspective view of part of the filter assembly according to the present invention.
Figure 9:
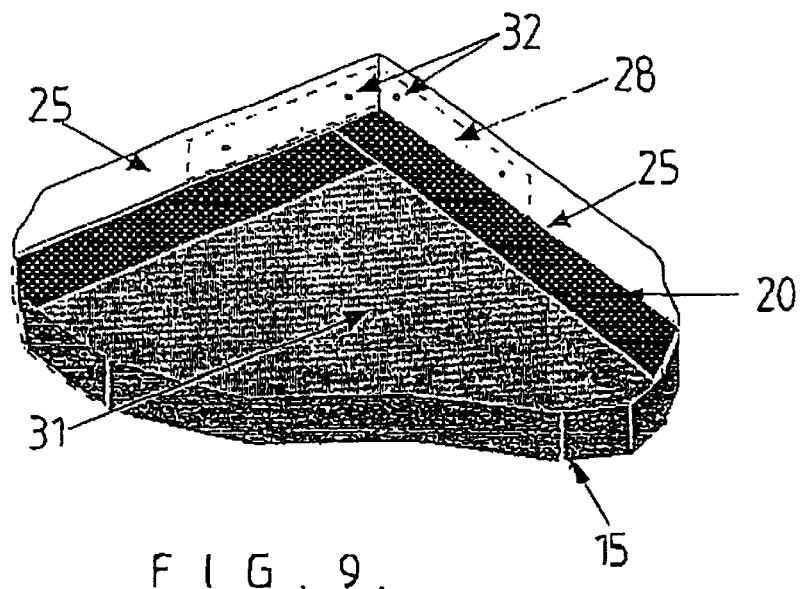
FIG. 9 is a further view of the completed part of the filter assembly shown in FIG. 8.

Referring now to FIGS. 7, 8 and 9, there is shown a metal filter 15 which incorporates a flame baffle 24. An L-shaped extrusion 25 is attached to the front (upstream) face of the metal filter 15 to form the projecting walls 23 referred to previously. Mounted to the upstream face of the metal filter 15 is a pre-filter support element 26 which provides a clearance between the pre-filter 17 and the front surface of the metal filter 15.

Reference to FIG. 2 shows in the upper part of the metal filter 15 the presence of the wire support mesh 26. It will be seen that once again the pre-filter 17 is held in place by engagement with a hook tape which extends about the peripheral front face of the metal filter 15. The projecting walls 23 added to the reusable metal filter 15 require that the flange on the inwardly extending aperture surround 16 (see lower part of FIG. 2) be straightened as shown by surround 19 in order to provide additional clearance to mount the modified metal filter 15.

The support mesh 26 can be mounted to the flame baffle 24 by use of any suitable anchoring means such as cable ties 27.

In a preferred form of the invention as shown in FIGS. 8 and 9, corner brackets 28 are mounted to the metal filter 15. The corner bracket 28 is generally of L cross-sectional shape but it has a return 29 which forms a locking flap which as shown in FIG. 8 engages beneath one flange 30 of a U-shaped channel which houses the filter core 31 of the metal filter 15. The element L-shaped extrusion 25 is therefore coupled to the corner bracket 28 using pot rivets 32. As a consequence the extrusions 25 are mounted to the metal filter 15 without any disfigurement of the filter.

Where the resultant damage to the flange is not an objection the extrusion forming the projecting walls 23 of the modified metal filter can be pop riveted directly into the flange of the metal channel surrounding and enclosing the core of the metal filter.

Wool may be used as a stand alone filter on its own, with or without supporting means, mounting within an aperture or the frame of a modified metal filter.

A jet of cool air may be directed from the front lower edge of the extraction hood towards the base of the mounted pre-filter(s) in order to first cool rising hot air from the preparation of flambé dishes which may otherwise damage the pre-filter. Similarly, the fitting of a less air permeable (needle punched/possibly heat treated) pre-filter immediately over the heat source will reduce the rate of ascent of hot air to enable cooling to first take place to thus achieve a reduction in heat related damage to the pre-filter 17. The two methods may be used in combination to achieve a reduction or elimination of heat damage to the pre-filter.

It may also be possible to use a metal mesh filtering material in a disposable manner.

According to the present invention there is therefore provided a woven or non-woven or needle punched natural or synthetic fibre pre-filter which is removably fitted within the exhaust hood preferably to the known metal filter or the hood or sandwiched between the metal filter and part of the hood. The pre-filter 17 thus can be readily removed and replaced.

Figures 10, 11:
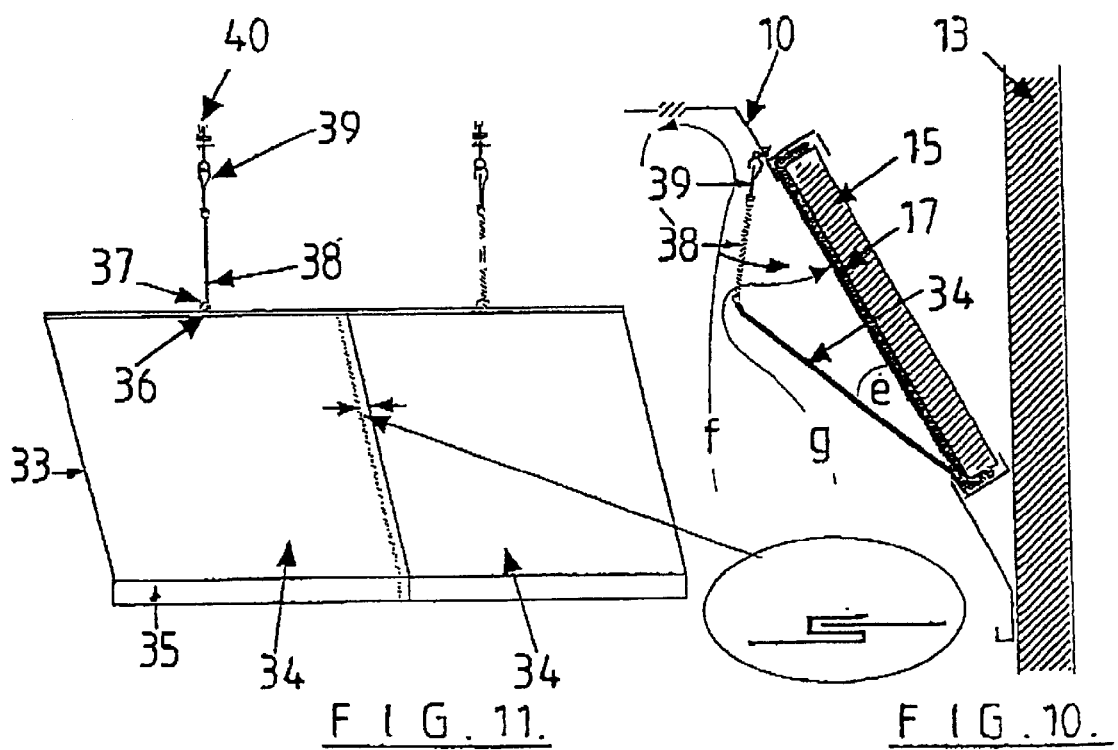
FIG. 10 is a sectioned view of a filter assembly according to the present invention with a heat sink assembly.
FIG. 11 is an elevation view of the heat sink assembly.

In FIGS. 10 and 11, there is shown a heat sink assembly 33 intended to primarily overcome damage to the pre-filter caused by transitory high heat released when food is prepared using the flambé technique. It, however, can also be useful to direct premature drip back of steam into the proper channels provided within the exhaust hood 10. As shown in FIGS. 10 and 11, the heat sink is located upstream (relative to air flow) of the filter assembly, thus by absorbing heat from rising hot air (g) the heat sink lowers the temperature of the rising air sufficiently to prevent damage occurring to the pre-filter 17. The hot air contained in rising air flow (f) is directed away from the disposable pre-filter 17 and mixes with colder air before entering the pre-filter 17.

In the illustrated form, the heat sink assembly 33 comprises one or more flat sheets 34 which in the preferred embodiment are preferably aluminium of a minimum 20 gauge. A lower angled edge 35 engages into channel 16 of the hood 10 as can be seen in FIG. 10. The top edge 36 of the heat sink sheet 34 includes a mounting 37 from which a flexible elongate member such as a chain 38 extends to a clip 39 which is engageable with a hook 40 mounted with the hood 10. In the preferred form of the invention angle (e) between the heat sink assembly 33 and the filter assembly is approximately 22°.

Other constructions of a heat sink installation of the general type shown in FIGS. 10 and 11 will be apparent to those skilled in the art.

The pre-filter is in the preferred form a disposable item. Virtually all airborne grease droplets from the air that passes through the pre-filter is securely trapped and removed from the air thereby reducing the build-up of contaminants on both the metal filters and the inside surfaces of the exhaust hood, fan motor, blades and ducting. The build-up of grease and contaminants on the upstream surface of the filter 17 is visually evident by discolouration as well as visible droplets. Air flow is also reduced. Thus it becomes apparent when the pre-filter requires replacement.

As disclosed herein, the filter system is simple to install and convenient to use, and is environmentally friendly. The pre-filter is a highly efficient filter without which fact the other benefits would not arise.

In a typical arrangement in, say, a fast food outlet a pre-filter would be expected to last for up to several weeks in areas of moderate soiling. However, by use of the pre-filter the period between cleaning of the metal filters, exhaust hood or ducting is dramatically extended and in particular the routine removal of metal filters for cleaning is dramatically reduced by the presence of the pre-filter. Reduced costs both as to labour and materials can be expected.

What is claimed is:

1. A filter assembly for use in an air filtration unit comprising:
    a filter disposed across an airflow aperture and
    a grease pre-filter disposed such that airflow passes through said grease pre-filter prior to passing through said filter,
    wherein said grease pre-filter is principally wool fiber having an approximate weight of 150–200 g/m² and a loft of substantially 15–20 mm.

2. The filter assembly according to claim 1 wherein the pre-filter is disposable.

3. The filter assembly according to claim 1 wherein the pre-filter is woven, non-woven or needle punched.

4. The filter assembly according to claim 1 wherein the pre-filter is a mix of high bulk wool fiber and a polyester fiber formed into a blanket.

5. The filter assembly according to claim 4 wherein the mix is substantially 90% wool and substantially 10% polyester.

6. The filter assembly according to claim 1 wherein the pre-filter is removably fastened to the filter.

7. The filter assembly according to claim 1 wherein the pre-filter is located in position by the filter fitting across said airflow.

8. The filter assembly according to claim 1 further including a heat sink located upstream of the pre-filter element.

9. A filter assembly for use in an air filtration unit comprising:
    a filter disposed across an airflow aperture;
    a pre-filter disposed such that airflow passes through said pre-filter prior to passing through said filter, said pre-filter being constructed solely or primarily of woven, non-woven or needle punched wool fiber, said pre-filter having a flame baffle and a support mesh located between said flame baffle and said pre-filter.

10. The filter assembly according to claim 9 wherein the support mesh is removably mounted with the filter element and flame baffle.

11. A grease pre-filter for use in an air flow passage of air filtration apparatus for cooking vapors, the pre-filter formed principally from wool fiber having an approximate weight of 150–200 g/m² and a loft of substantially 15–20 mm.

12. The grease pre-filter according to claim 11 wherein said pre-filter is woven, non-woven or needle punched.

13. The grease pre-filter according to claim 11 wherein said pre-filter is a mix of high bulk wool fiber and a polyester fiber formed into a blanket.

14. The grease pre-filter according to claim 13 wherein said mix is substantially 90% wool and 10% polyester.

15. The grease pre-filter according to claim 11 wherein said pre-filter further comprises at least in part a colour-fast dyed fiber to produce a tint to the pre-filter.

16. The grease pre-filter according to claim 11 wherein said pre-filter further comprises an antimicrobial chemical.

17. A method of modifying an air filtration unit which includes a filter element disposed in an airflow passage or across an aperture into an airflow passage, the method comprising the step of:
    mounting a disposable grease pre-filter that is a woven, non-woven or needle punched blanket formed predominantly from wool having an approximate weight of 150–200 g/m² and a loft of substantially 15–20 mm.

18. The method according to claim 17 wherein the pre-filter is held in place by a connector.

19. The method according to claim 17 wherein the pre-filter is held in position by the filter element.

20. A filter assembly for use in an air filtration unit comprising:
    a filter disposed across an airflow aperture and
    a pre-filter disposed such that airflow passes through said pre-filter prior to passing through said filter, said pre-filter being a mix of high bulk wool fiber and a polyester fiber formed in woven, non-woven or needle punched blanket.

21. The filter assembly of claim 20 wherein the mix is substantially 90% wool and substantially 10% polyester.

* * * * *